(12) United States Patent
Veltum et al.

(10) Patent No.: US 11,215,259 B2
(45) Date of Patent: Jan. 4, 2022

(54) VIBRATION DAMPER

(71) Applicants: ThyssenKrupp Bilstein GmbH, Ennepetal (DE); thyssenkrupp AG, Essen (DE)

(72) Inventors: Christian Veltum, Iserlohn (DE); Raimund Weiffen, Windeck-Dattenfeld (DE); Marc Schmitz, Dortmund (DE); Hakan Severcan, Hagen (DE); Sebastian Stottrop, Essen (DE)

(73) Assignees: THYSSENKRUPP BILSTEIN GMBH, Ennepetal (DE); THYSSENKRUPP AG, Essen (DE)

( * ) Notice: Subject to any disclaimer, the term of this patent is extended or adjusted under 35 U.S.C. 154(b) by 52 days.

(21) Appl. No.: 16/007,093

(22) Filed: Jun. 13, 2018

(65) Prior Publication Data
US 2018/0355942 A1  Dec. 13, 2018

(30) Foreign Application Priority Data
Jun. 13, 2017 (DE) ..................... 10 2017 112 998.7

(51) Int. Cl.
*F16F 9/32* (2006.01)
*F16F 9/06* (2006.01)
(Continued)

(52) U.S. Cl.
CPC ............ *F16F 9/3242* (2013.01); *B60G 13/08* (2013.01); *F16F 9/061* (2013.01); *F16F 9/19* (2013.01);
(Continued)

(58) Field of Classification Search
CPC .. F16F 9/3242; F16F 9/061; F16F 9/19; F16F 9/366; F16F 2230/0005; F16F 2230/0023
See application file for complete search history.

(56) References Cited

U.S. PATENT DOCUMENTS

| | | | | |
|---|---|---|---|---|
| 3,164,381 A | * | 1/1965 | Tuczek ................... | F16F 9/067 267/64.15 |
| 4,085,925 A | * | 4/1978 | Peddinghaus ............. | F16F 9/06 188/282.8 |

(Continued)

FOREIGN PATENT DOCUMENTS

| | | |
|---|---|---|
| AT | 245400 B | 2/1966 |
| DE | 1057403 B | 5/1959 |

(Continued)

*Primary Examiner* — Robert A. Siconolfi
*Assistant Examiner* — James K Hsiao
(74) *Attorney, Agent, or Firm* — thyssenkrupp North America, LLC

(57) ABSTRACT

A vibration damper may include a damper cylinder, a guiding closure that is held in the damper cylinder by a first clamping element, a piston rod that is axially guided in the guiding closure, and a piston rod functional group that is connected to the piston rod and disposed in the damper cylinder. At least one second clamping element may be connected to an internal wall of the damper cylinder, and a holding element may be disposed in the damper cylinder. The second clamping element can be disposed between the guiding closure and the holding element, and the holding element can be disposed between the second clamping element and the piston rod functional group. Further, the internal diameter of the second clamping element at least in portions is smaller than the external diameter of the holding element.

20 Claims, 1 Drawing Sheet

(51) Int. Cl.
*B60G 13/08* (2006.01)
*F16F 9/19* (2006.01)
*F16F 9/36* (2006.01)

(52) U.S. Cl.
CPC ............ *F16F 9/3271* (2013.01); *F16F 9/366* (2013.01); *B60G 2202/24* (2013.01); *B60G 2206/41* (2013.01); *F16F 2230/0005* (2013.01); *F16F 2230/0023* (2013.01)

(56) References Cited

U.S. PATENT DOCUMENTS

| | | | | | |
|---|---|---|---|---|---|
| 4,225,263 | A * | 9/1980 | Asberg | ................... | F16B 21/18 403/326 |
| 4,924,758 | A * | 5/1990 | Yuda | ................... | F01B 11/02 92/128 |
| 5,584,368 | A * | 12/1996 | Larsson | ................. | F16F 9/362 188/322.17 |
| 5,651,303 | A * | 7/1997 | Fish | ................... | F15B 15/1438 29/453 |
| 5,778,760 | A * | 7/1998 | Yuda | ................... | F01B 7/00 92/128 |
| 6,263,779 | B1 * | 7/2001 | Oliver | ................. | F15B 15/1438 92/128 |
| 6,640,943 | B1 * | 11/2003 | Daws | ................... | F16F 9/3242 188/322.17 |
| 6,988,600 | B1 | 1/2006 | Heideman | | |
| 7,455,010 | B2 * | 11/2008 | Westendorf | ......... | F15B 15/1438 92/128 |
| 8,393,686 | B2 * | 3/2013 | Dunigan | ................... | B60P 1/20 298/22 R |
| 8,807,016 | B2 * | 8/2014 | Beumer | ............... | F15B 15/1438 92/169.1 |
| 9,359,801 | B2 * | 6/2016 | Weber | ....................... | E05F 5/10 |
| 2003/0178268 | A1 * | 9/2003 | Ananthanarayanan | ...................... | F16F 9/3242 188/321.11 |
| 2005/0023093 | A1 * | 2/2005 | Leiphart | ................ | B60G 17/08 188/283 |
| 2009/0107781 | A1 | 4/2009 | Fritz | | |
| 2010/0170062 | A1 * | 7/2010 | Kim | ........................ | E05F 5/10 16/52 |
| 2011/0083929 | A1 * | 4/2011 | Marking | ................ | B60G 17/08 188/267.2 |
| 2016/0169316 | A1 * | 6/2016 | Kubota | ................... | F16F 9/061 188/269 |
| 2016/0312851 | A1 | 10/2016 | Hamers | | |
| 2017/0138432 | A1 * | 5/2017 | Takeuchi | ............... | F16F 9/362 |

FOREIGN PATENT DOCUMENTS

| | | |
|---|---|---|
| DE | 4436967 A | 4/1996 |
| DE | 19823024 C | 3/2000 |
| DE | 10316188 B | 10/2004 |
| FR | 2723624 A | 2/1996 |

* cited by examiner

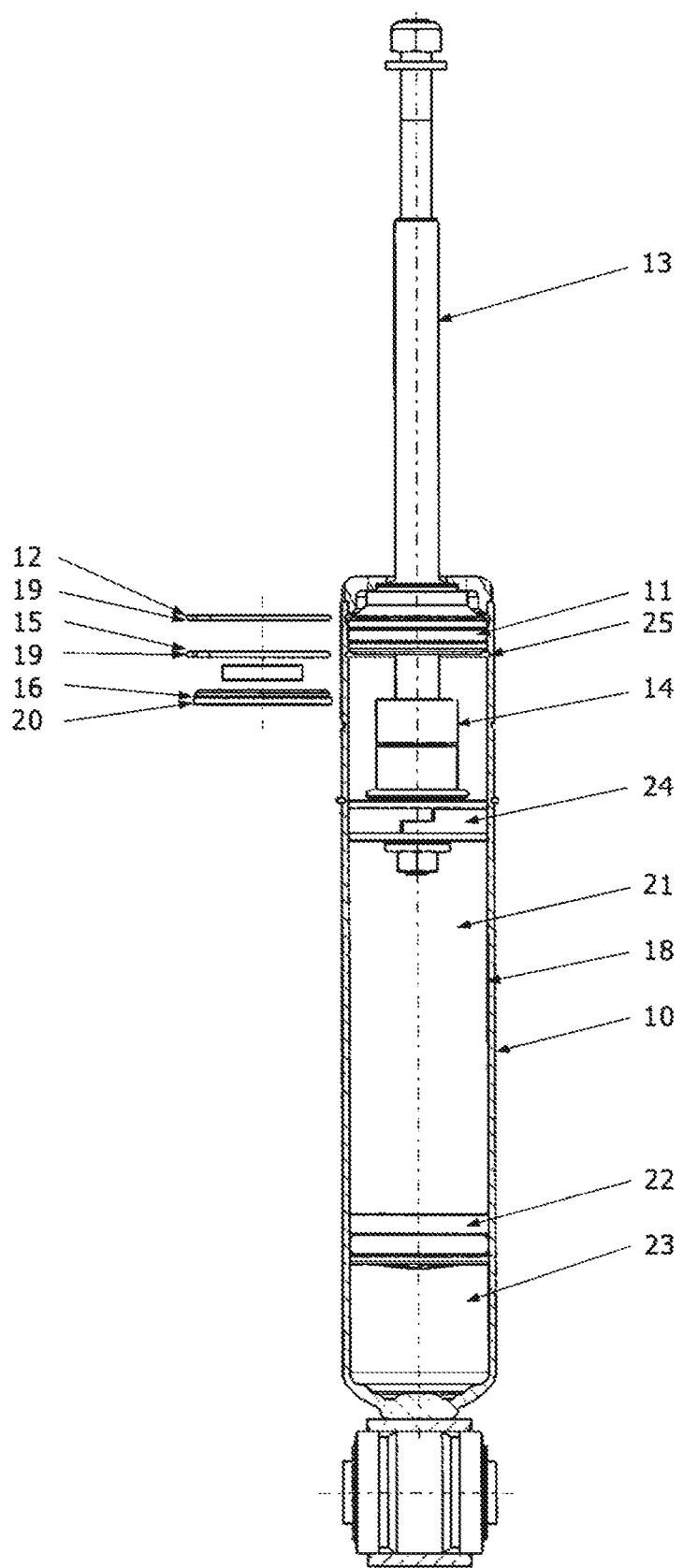

VIBRATION DAMPER

CROSS-REFERENCE TO RELATED APPLICATION

This application is a non-provisional application claiming priority to German Patent Application No. DE 102017112998.7, which was filed Jun. 13, 2017, the entire contents of which are hereby incorporated by reference herein.

FIELD

The present disclosure generally relates to vibration dampers, including vibration dampers for motor vehicles.

BACKGROUND

A vibration damper is known, for example, from German Patent No. DE 44 36 967 A1. Single-tube gas-assisted shock absorbers are usually used in motor vehicles, in sports vehicles, and in the industrial sector. Because of the large effective area of the damper piston, the single-tube technology permits an increased damping force, improved handling, a constantly higher performance, and a longer service life. As opposed to the dual-tube technology, the installation possibilities are more flexible since there are fewer restrictions in terms of the installation position.

Known single-tube gas-assisted shock absorbers comprise a closure pack that closes the operating chamber that is configured in the damper tube and guides the piston rod of the shock absorber. In the case of the vibration damper according to German Patent No. DE 44 36 967 A1, the closure pack is axially fixed in the damper tube by a snap ring. The snap ring can be released such that the vibration damper can be disassembled in a non-destructive manner.

A single-tube vibration damper of this type, in a country-specific manner, is to be classified as a hazardous product and to be declared by way of a respective hazardous product identification since there is the risk of the vibration damper being destroyed in the case of an excessive influence of heat. In concrete terms, in the case of an explosion of the vibration damper, the components located in the damper tube, in particular the piston rod functional group and the closure pack, can damage or destroy the snap ring or the seat of the latter, for example a groove, in the cylinder tube such that in an extreme case fragments of the piston rod functional group can make their way from the damper tube to the outside.

Therefore, single-tube dampers of this type are correspondingly classified. On account thereof, transportation costs as well as costs and complexities for the declaration of shock absorbers arise in terms of logistics or airfreight.

One possibility of increasing the safety in relation to damage of the vibration damper in the case of high temperatures lies in fixing the closure pack by beads or by crimping the tube rim in the damper tube. These fixing features have the disadvantage that the vibration damper cannot be disassembled in a non-destructive manner.

Thus a need exists for a vibration damper which offers enhanced safety in terms of the excessive influence of heat, and which can be disassembled in a non-destructive manner.

BRIEF DESCRIPTION OF THE FIGURE

FIG. 1 is an exploded schematic view of an example hydraulic single-tube damper.

DETAILED DESCRIPTION

Although certain example methods and apparatuses have been described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art In some examples, a vibration damper may include a damper cylinder and a guiding closure that is held in the damper cylinder by a first clamping element. The vibration damper comprises a piston rod that is axially guided in the guiding closure, and a piston rod functional group that is connected to the piston rod and is disposed in the damper cylinder. According to the present disclosure, at least one second clamping element may be connected to an internal wall of the damper cylinder. A holding element can be disposed in the damper cylinder. The second clamping element may be disposed between the guiding closure and the holding element. Further, the holding element may be disposed between the second clamping ring and the piston rod functional group. In some cases, the internal diameter of the second clamping element at least in portions is smaller than the external diameter of the holding element.

The present disclosure has the advantage that the damper cylinder comprises an additional protection against overheating and the overpressure created on account thereof. Even when the guiding closure should be released from the connection and the first clamping element should be destroyed on account of the overpressure in the damper cylinder, the second clamping element conjointly with the holding element prevents the remaining components disposed in the damper cylinder, in particular the piston rod functional group, being ejected from the damper cylinder. The same applies to fragments of said components which in the case of an explosion are retained in the damper cylinder by the holding element in collaboration with the second clamping element.

The protection function is achieved according to the present disclosure in that at least one second clamping element is connected to the internal wall of the damper cylinder. The second clamping element is capable of absorbing the forces that are exerted by the piston rod functional group in the case of an explosion, and of dissipating said forces into the damper cylinder. The second clamping element prevents the piston rod functional group from making its way in an uncontrolled manner from the damper cylinder into the environment.

To this end, the second clamping element interacts with the holding element which is disposed in the damper cylinder. The holding element transmits the forces of the piston rod functional group to the second clamping element when the holding element in the case of an explosion or in the case of overpressure impacts the second clamping element.

The second clamping element is disposed between the guiding closure and the holding element. In a protection event, the holding element is therefore pressed against the second clamping element.

It can be derived from the arrangement above that the guiding closure is disposed between the first and the second clamping element.

The holding element is disposed between the second clamping ring and the piston rod functional group. It is achieved on account thereof that the kinetic energy of the piston rod functional group in a protection event is transmitted to the holding element and from there to the second clamping element.

For the stop function of the holding element, the internal diameter of the second clamping element at least in portions is smaller than the external diameter of the holding element. The holding element, on account thereof, is retained in the damper cylinder by the second clamping element. The direction of movement of the piston rod functional group herein is performed in the direction of the guiding closure.

The present disclosure enables the transportation and the handling of the vibration damper without a classification of the vibration damper as a hazardous product being required. The transportation costs are reduced and the handling of the vibration damper is facilitated, or rendered safer, respectively, on account thereof. The present disclosure is particularly suitable for hydraulic single-tube vibration dampers, without being limited to dampers of this type. It is also conceivable for the present disclosure to be used in dual-tube vibration dampers.

As opposed to fixing the guiding closure by a plastic deformation of the damper cylinder, the present disclosure by virtue of the two clamping elements permits a non-destructive disassembly of the vibration damper.

The second clamping element can thus be held in a groove which is configured in the internal wall of the damper cylinder between the guiding closure and the holding element. A fixed mechanical connection between the second clamping element and the damper cylinder is achieved on account thereof, said damper cylinder being able to absorb the forces that are created in the case of an explosion, or in the case of overpressure, respectively.

In some examples, both clamping elements may be releasably connected to the damper cylinder. This has the advantage that the vibration damper can be disassembled in a non-destructive manner in a particularly simple way.

In one example, the first clamping element and/or the second clamping element are/is configured as a snap ring. The snap ring herein forms a circlip which holds in a form-fitting manner the respectively associated component, for example the guiding closure or the holding element, respectively, in the axial direction of the damper cylinder.

In some examples, the holding element is connected to the piston rod functional group or is configured so as to be integral to the piston rod functional group. The holding element in the operation of the vibration damper is thus conjointly moved with the piston rod functional group. In the event of an explosion the holding element is likewise conjointly moved with the piston rod functional group and impacts the second clamping element such that the piston rod functional group is retained in the damper cylinder.

In the case of the first variant in which the holding element is connected to the piston rod functional group, there is the advantage that the piston rod functional group, conjointly with the holding element, can be preassembled on the piston rod. The overall assembly is facilitated on account thereof. The same applies to the integral construction mode of the second variant. An integral construction mode is understood to be a configuration of the holding element so as to be integral to the piston rod functional group. Components of the piston rod functional group that are present anyway, for example one of the spacers on the piston rod functional group, herein can be configured so as to have an enlarged external diameter such that the piston rod functional group is retained in the damper cylinder by the second clamping element when a protection event arises because of an excessive influence of heat.

Alternatively, the holding element can be releasably connected to the internal wall of the damper cylinder. In this case, the holding element can be disposed so as to be stationary in the damper cylinder. The piston rod functional group moves relative to the holding element. It is expedient for the holding element to be disposed close to the second clamping element.

The holding element may be releasably connected to the internal wall of the damper cylinder, the holding element thus being capable of disassembly. The holding element can be connected, for example, in a force-fitting manner, for example by way of a clamping connection, to the internal wall of the damper cylinder. There are further possibilities to this end.

The holding element can be configured as a disc through which the piston rod is guided. The external diameter of the disc is dimensioned such that said external diameter in a protection event impacts the second clamping element.

The single-tube vibration damper illustrated in the only figure is provided for motor vehicles, sports vehicles, or for use in the industrial sector. The present disclosure is not limited to fields of application of this type. The vibration damper comprises a damper cylinder 10 which delimits an operating chamber 21. The operating chamber 21 is filled with damping liquid. The operating chamber 21 in the axial direction is delimited by the guiding closure 11, on the one hand, and by a separation piston 22, on the other hand. The separation piston 22 delimits the operating chamber 21 in relation to an equalization chamber 23 that is filled with gas. The piston rod functional group 14 is disposed so as to be axially movable in the operating chamber 21, said piston rod functional group 14 being fixedly connected to the piston rod 13. The piston rod 13 is axially guided in the guiding closure 11. The piston rod functional group 14, in a manner known per se, comprises a damper piston 24 with valves.

In the example illustrated in FIG. 1, the guiding closure 11 is disposed on a first axial end of the damper cylinder 10, said guiding closure 11 closing the damper cylinder 10 in a fluid-tight manner.

The guiding closure 11 in the longitudinal direction of the damper cylinder 10 is axially held by a first clamping element 12. The first clamping element 12 is disposed on that side of the guiding closure 11 that faces away from the operating chamber 21. In other words, the first clamping element 12 is disposed between the guiding closure 11 and the external rim of the damper cylinder 10.

The first clamping element 12 may be configured as a snap ring 19. The snap ring 19, or generally the clamping element 12, respectively, is held in a groove 25 which is configured in the internal wall 18 of the damper cylinder 10. The groove 25 extends perpendicularly to the longitudinal axis of the damper cylinder 10. In the assembled state, the upper side of the guiding closure 11 lies against the snap ring 19, or generally on the clamping element 12, respectively.

A second clamping element 15 is disposed below the guiding closure 11, that is to say on that side of the guiding closure 11 that faces the operating chamber 21. The second clamping element 15 can be configured, for example, as a snap ring 19.

The second clamping element 15, or the snap ring 19, respectively, is configured in a second groove (not illustrated) in the internal wall 18 of the damper cylinder 10.

The present disclosure is not limited to a snap ring as a clamping element. Other clamping elements which enable a form-fitting or force-fitting connection to the internal wall 18 of the damper cylinder 10 can be used in the context of the present disclosure. The snap rings 19 have the advantage that said snap rings 19 are releasably connected to the internal wall 18.

In some instances, it is possible for the two clamping elements 12, 15 to be configured dissimilarly. For example, the second clamping element 15 can be dimensioned larger and/or be made from another material than the first clamping element 12 in order to be able to absorb higher forces in a protection event.

A holding element 16, which may be configured as a disc 20, can be disposed in the damper cylinder 10. Other holding elements 16 are conceivable. The holding element 16 is disposed between the second clamping element 15 and the piston rod functional group 14. The holding element 16 is connected to the upper side of the piston rod functional group 14, that is to say to that side of the piston rod functional group 14 that faces the guiding closure 11. The holding element 16 is thus disposed between the piston rod functional group 14 and the second clamping element 15.

The following sequence of the components of the vibration damper results overall: first clamping element 12, guiding closure 11, second clamping element 15, holding element 16, and piston rod functional group 14.

For the stop function, the external diameter of the disc 20, or generally of the holding element 16, respectively, is larger than the internal diameter of the second clamping element 15, or of the second snap ring 19, respectively. In the case of the initial example of the only figure, the entire external diameter of the disc 20 is larger than the entire internal diameter of the second clamping element 15, or of the second snap ring 19, respectively. It is also possible for the aforementioned overlap to arise only in portions. In a protection event, when the holding element 16 is pressed against the second clamping element 15, there is an overlap of the two components at least in portions, such that the holding element 16 is held in the damper cylinder 10.

In some examples, the holding element 16 may be connected to the internal wall 18 of the damper cylinder 10. This arrangement has the advantage that the damper cylinder 10 comprises a triple protection which even in the case of high temperatures and of a corresponding overpressure in the damper cylinder securely retains the piston rod functional group 14 in the damper cylinder 10.

The holding element 16 is pressed and held against the second clamping element 15 when the connection of the holding element 16 to the internal wall 18 does not resist the overpressure, or the kinetic energy of the piston rod functional group 14, respectively. There is thus a double protection on that side of the guiding closure 11 that faces the operating chamber 21. Together with the first clamping element 12, the vibration damper comprises a triple protection.

In a protection event, that is to say in the case of an excessive influence of heat and/or an explosion of the fluid in the damper cylinder 10, the piston rod functional group 14 is moved by way of a high kinetic energy towards the second clamping element 15. The holding element 16 on the piston rod functional group 14 herein is conjointly moved until said holding element 16 impacts the second clamping element 15 and is retained. It is prevented on account thereof that the piston rod functional group 14 is moved out of the damper cylinder 10.

LIST OF REFERENCE SIGNS

10 Damper cylinder
11 Guiding closure
12 First clamping element
13 Piston rod
14 Piston rod functional group
15 Second clamping element
16 Holding element
17 Not allocated
18 Internal wall
19 Snap ring
20 Disc
21 Operating chamber
22 Separation piston
23 Equalization chamber
24 Damper piston
25 Groove

What is claimed is:

1. A vibration damper comprising:
   a damper cylinder with an internal wall;
   a guiding closure that is held in the damper cylinder by a first clamping element;
   a piston rod that is axially guided in the guiding closure;
   a piston rod functional group comprising a damper piston that is connected to the piston rod and disposed in the damper cylinder;
   a second clamping element connected to the internal wall of the damper cylinder; and
   a holding element that is connected to the piston rod functional group so as to be axially movable with the piston rod functional group within the damper cylinder, the holding element disposed between the second clamping element and the piston rod functional group, wherein the second clamping element is disposed axially between the guiding closure and the holding element, wherein an internal diameter of the second clamping element is smaller at least at some portions than an external diameter of the holding element.

2. The vibration damper of claim 1 wherein the second clamping element is held in a groove in the internal wall of the damper cylinder between the guiding closure and the holding element.

3. The vibration damper of claim 1 wherein the first and second clamping elements are releasably connected to the damper cylinder.

4. The vibration damper of claim 1 wherein the first and second clamping elements are configured as snap rings.

5. The vibration damper of claim 1 wherein the holding element is connected directly to the piston rod functional group.

6. The vibration damper of claim 1 wherein the holding element is integral to the piston rod functional group.

7. The vibration damper of claim 1 wherein the second clamping element is disposed axially between the guiding closure and the holding element such that the holding element and the second clamping element are axially closer to the guiding closure than the piston rod functional group.

8. The vibration damper of claim 1 wherein the damper piston includes valves through which damping liquid is configured to pass.

9. The vibration damper of claim 1 wherein an outer diameter of the piston rod functional group is smaller than an outer diameter of the damper piston.

10. A vibration damper comprising:
a damper cylinder with an internal wall;
a guiding closure that is held in the damper cylinder by a first clamping element;
a piston rod that is axially guided in the guiding closure and occupies an opening of the guiding closure in a fully retracted position and in a fully extended position;
a piston rod functional group comprising a damper piston that is connected to the piston rod and disposed in the damper cylinder;
a second clamping element connected to the internal wall of the damper cylinder; and
a holding element disposed in the damper cylinder, the holding element disposed between the second clamping element and the piston rod functional group, wherein the second clamping element is disposed axially between the guiding closure and the holding element such that the holding element is axially closer to the guiding closure than the piston rod functional group, wherein an internal diameter of the second clamping element is smaller at least at some portions than an external diameter of the holding element.

11. The vibration damper of claim 10 wherein the second clamping element is disposed axially between the guiding closure and the holding element such that the holding element and the second clamping element are axially closer to the guiding closure than the piston rod functional group.

12. The vibration damper of claim 10 wherein the holding element is axially movable within the damper cylinder when the vibration damper is in an assembled, operational state.

13. The vibration damper of claim 10 wherein the damper piston includes valves through which damping liquid is configured to pass.

14. The vibration damper of claim 10 wherein the holding element is connected directly to the piston rod functional group.

15. The vibration damper of claim 10 wherein an outer diameter of the piston rod functional group is smaller than an outer diameter of the damper piston.

16. A vibration damper comprising:
a damper cylinder with an internal wall;
a guiding closure that is held in the damper cylinder by a first clamping element;
a piston rod that is axially guided in the guiding closure;
a piston rod functional group comprising a damper piston that is connected to the piston rod and disposed in the damper cylinder, wherein the damper piston includes valves through which damping liquid is configured to pass;
a second clamping element connected to the internal wall of the damper cylinder; and
a holding element disposed in the damper cylinder, the holding element disposed between the second clamping element and the piston rod functional group, wherein the second clamping element is disposed axially between the guiding closure and the holding element, wherein an internal diameter of the second clamping element is smaller at least at some portions than an external diameter of the holding element.

17. The vibration damper of claim 16 wherein the second clamping element is disposed axially between the guiding closure and the holding element such that the holding element and the second clamping element are axially closer to the guiding closure than the piston rod functional group.

18. The vibration damper of claim 16 wherein the holding element is axially movable within the damper cylinder when the vibration damper is in an assembled, operational state.

19. The vibration damper of claim 16 wherein the holding element is connected directly to the piston rod functional group.

20. The vibration damper of claim 16 wherein an outer diameter of the piston rod functional group is smaller than an outer diameter of the damper piston.

\* \* \* \* \*